J. M. MORROW.
APPARATUS FOR DESTROYING INSECTS.
APPLICATION FILED MAY 12, 1916.

1,189,720.

Patented July 4, 1916.
4 SHEETS—SHEET 1.

Witnesses
Wm F Doyle.
L. R. Fiedler.

Inventor
J. M. Morrow
By Frank H. Hoyt
Attorney

UNITED STATES PATENT OFFICE.

JAMES MORTON MORROW, OF STEPHENVILLE, TEXAS, ASSIGNOR OF ONE-HALF TO
J. J. BENNETT, OF STEPHENVILLE, TEXAS.

APPARATUS FOR DESTROYING INSECTS.

1,189,720.  Specification of Letters Patent.  Patented July 4, 1916.

Application filed May 12, 1916.  Serial No. 97,115

*All whom it may concern:*

Be it known that I, JAMES M. MORROW, a citizen of the United States, residing at Stephenville, in the county of Erath and State of Texas, have invented certain new and useful Improvements in Apparatus for Destroying Insects; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for destroying insects, especially boll weevils and consists in the provision of a simple and efficient apparatus of this nature, comprising a pneumatic suction means, driven by any suitable motive power and adapted to draw up by pneumatic force the small squares of the cotton bloom affected by the deposit of eggs of the boll weevil and destroying the same by fire.

The invention comprises an apparatus of this nature having various details of construction, combinations and arrangements of parts which will be hereinafter fully described, shown in the accompanying drawings and then specifically defined in the appended claim.

My invention is illustrated in the accompanying drawings, in which:—

Figure 1:
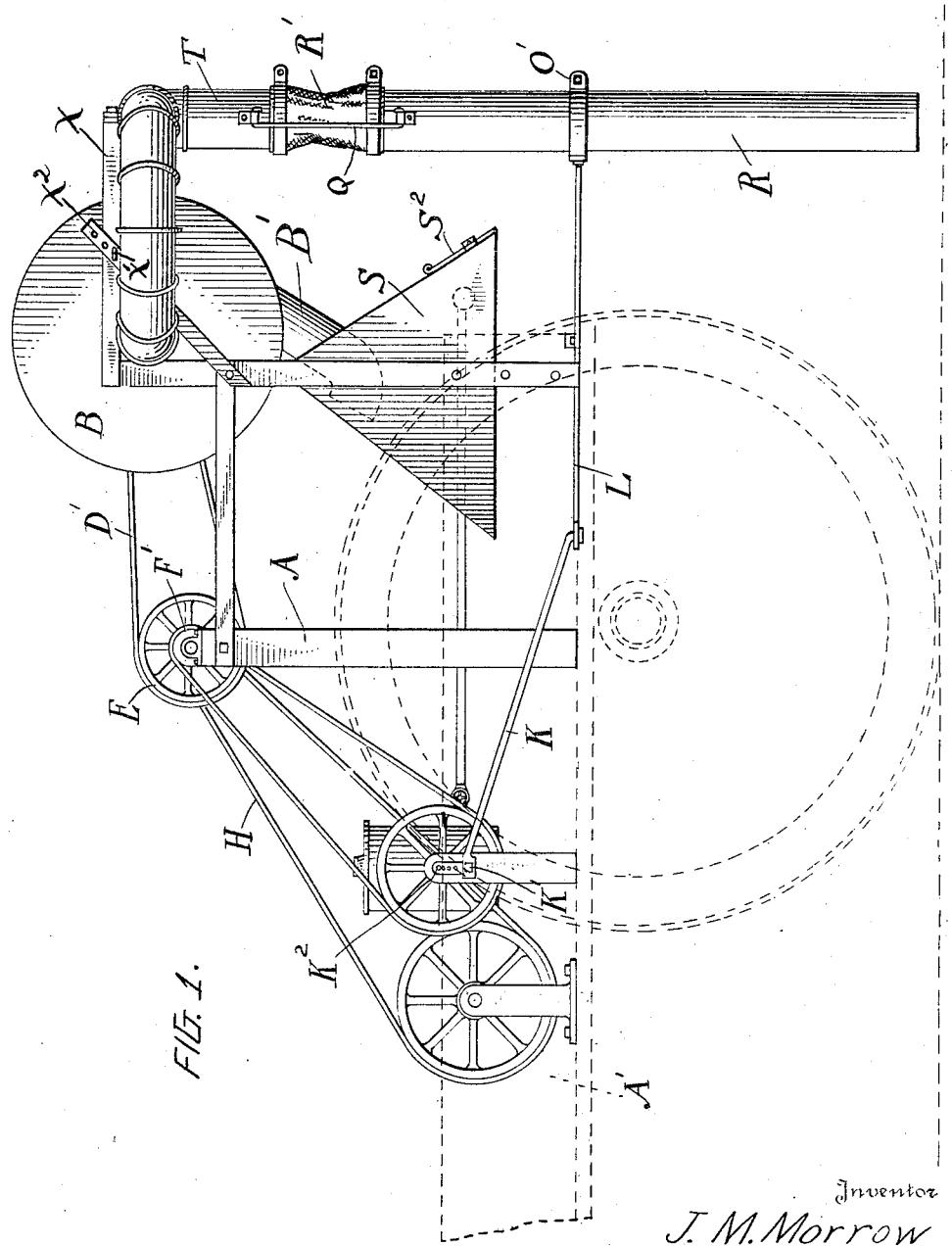
Figure 2:
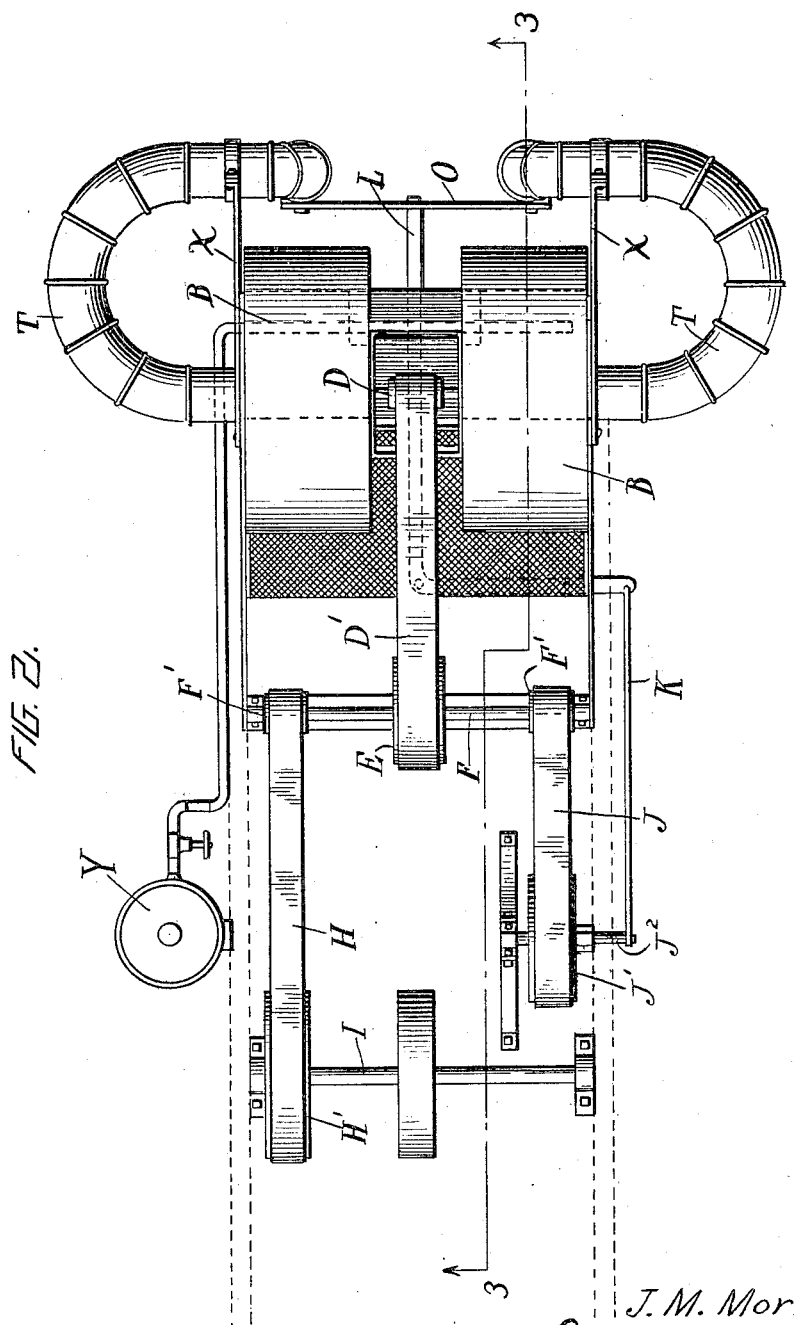
Figure 3:
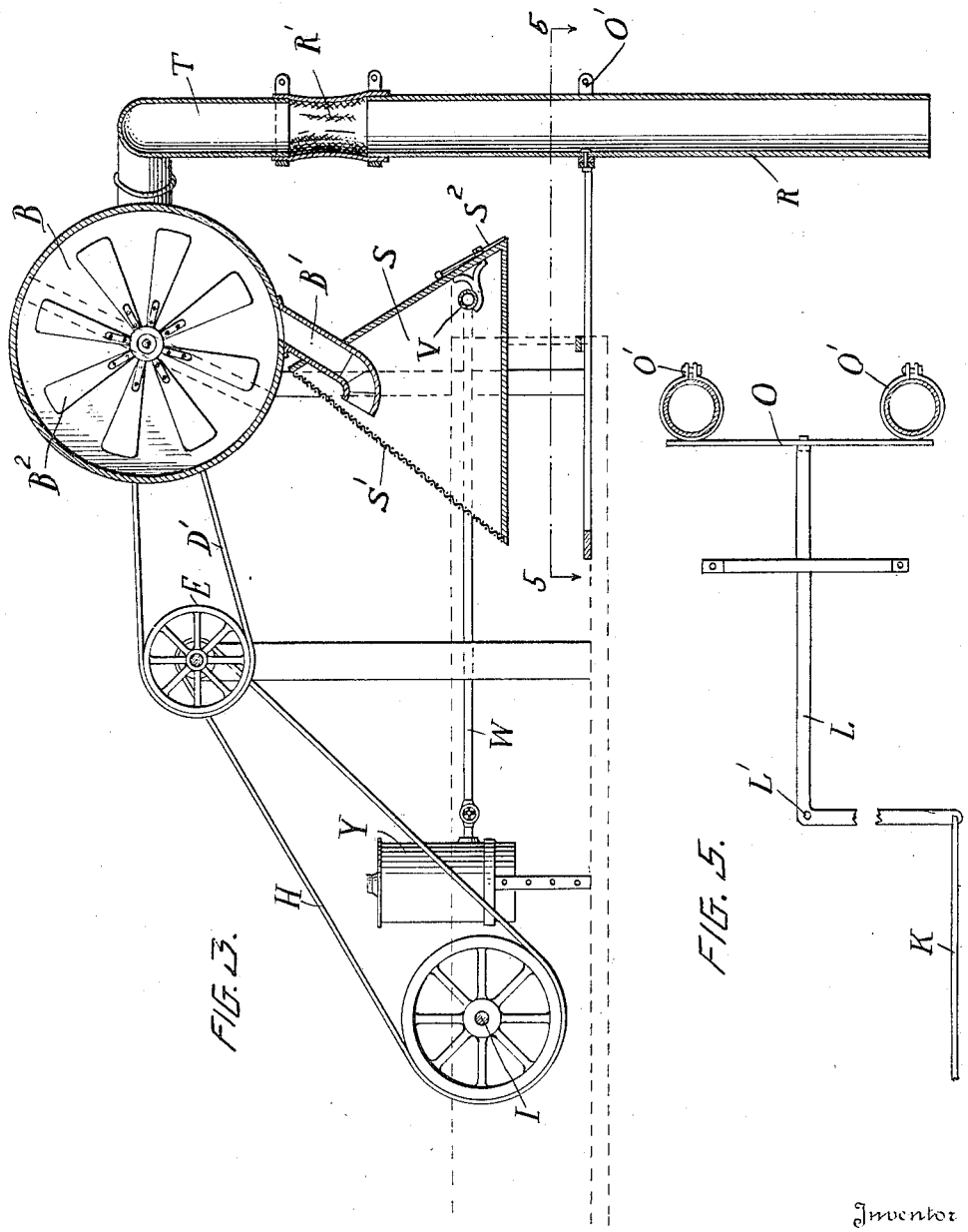
Figure 4:
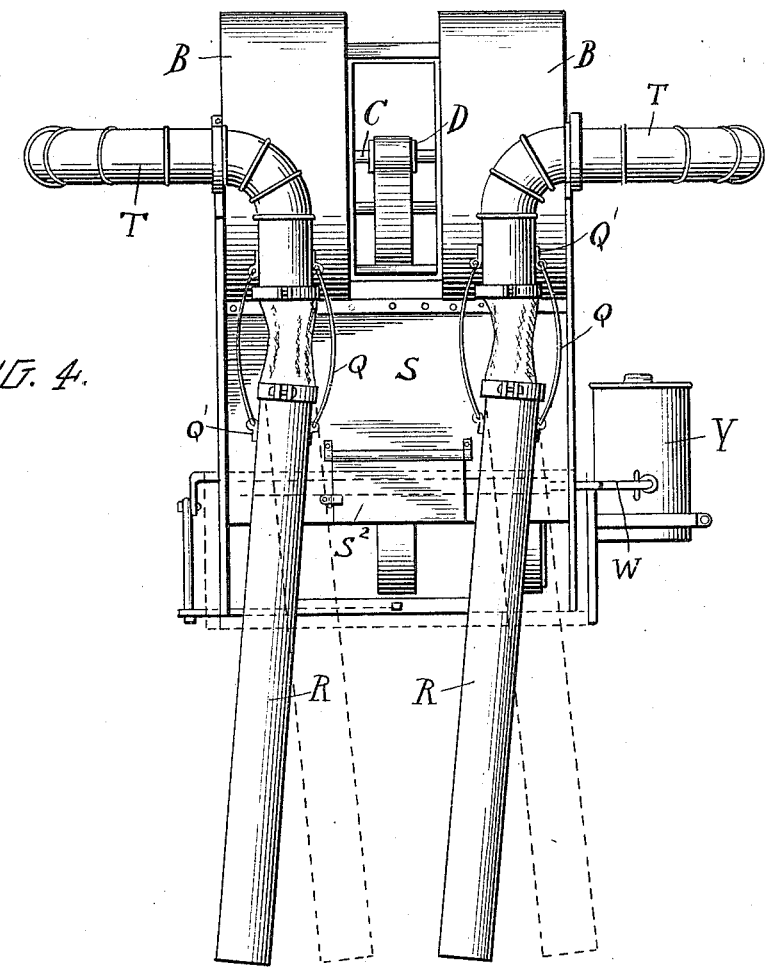
Figure 6:
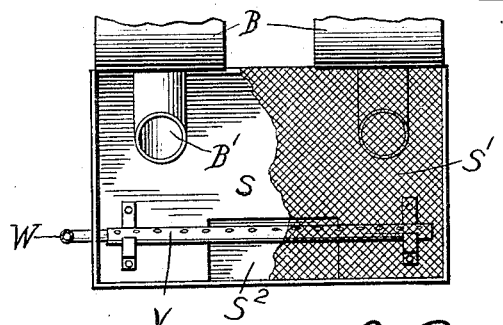

Figure 1 is a side elevation of the apparatus which is adapted to be attached to a wagon. Fig. 2 is a top plan view. Fig. 3 is a sectional view on line 3—3 of Fig. 2. Fig. 4 is a rear elevation. Fig. 5 is a sectional view on line 5—5 of Fig. 3, and Fig. 6 is a detail view of the receptacle into which the squares are blown and burned.

Reference now being had to the details of the drawings by letter, A designates the frame of the apparatus which is adapted to be fastened to the rear end of a wagon box, shown in dotted lines and designated by letter A'. Mounted upon said frame are suction drums B, two being shown in the drawings, and which have a central driving shaft C to which a pulley D is fixed, driven by belted connection D' with a pulley E, keyed to the shaft F, which latter has pulleys F' and $F^2$ thereon, one of which has belted connection H with a pulley H' fixed to the shaft I, adapted to be driven by any suitable power. The said pulley F' has belted connection J with the counter shaft $J^2$. A pitman K is pivoted, through the medium of the pivot K', with a crank arm $K^2$ fixed to the shaft $J^2$ and said pitman has pivotal connection with an angle bar L, shown in detail in Fig. 5 of the drawings, and which is pivoted at L' to the wagon box and its long arm is connected to a cross bar O having two straps O' thereon which surround the suction pipes R. The pipes R have flexible connections R' with the downwardly extended ends of the pipes T which communicate with the interior of the drums B in which the fan wheels B' are adapted to rotate. An exit pipe $B^2$ extends from each fan casing and opens into the compartment S where the squares containing the eggs of the boll weevil are adapted to be consumed by fire, a suitable burner V being positioned within the compartment S and the liquid fuel conveyed thereto through the pipe W from the supply tank Y. Said compartment S is provided with a screen S' upon one side and a suitable door $S^2$ upon the rear thereof, whereby access may be had to the interior of the compartment.

In order to raise or lower the suction pipes to conform to uneven surfaces of the ground, metallic strips X are secured to the beam at one end and their other ends adjustably held by means of bolts X' in one or another of the holes $X^3$, as will be seen in the drawings. In order to protect the flexible joints, links, designated by letter Q, pivotally connect the plates Q' fastened to the adjacent ends of the pipes R and T.

The operation of the invention will be readily understood and is as follows:—The wagon to which the team is adapted to be connected is driven over the cotton field and the squares of the cotton bloom in which the eggs of the boll weevil are deposited are shaken off upon the ground. The fans which are driven by the motor will form a suction and the squares will be drawn up through the pipes and deposited into the chamber in which the burner is located, thus destroying the same by fire. As the apparatus travels over the ground, a swinging movement is imparted to the pipes R, causing the lower free ends to be deposited at different locations over the surface of the ground in order to suck all of the squares.

What I claim to be new is:—

An apparatus for destroying insects consisting of a frame for attachment to a wagon, suction fans and drums with pipes leading therefrom, flexible pipes communicating with the pipes which lead from said drums, a driving shaft upon the frame, connections between the same and the fan, a pitman connected to said driving shaft, straps fastened to the flexible pipes, and connections between the straps and pitman for causing the flexible pipes to oscillate.

In testimony whereof I hereunto affix my signature in presence of two witnesses.

JAMES MORTON MORROW.

Witnesses:
FRANK CARLTON,
J. A. BANKMAN.